Patented Sept. 18, 1951

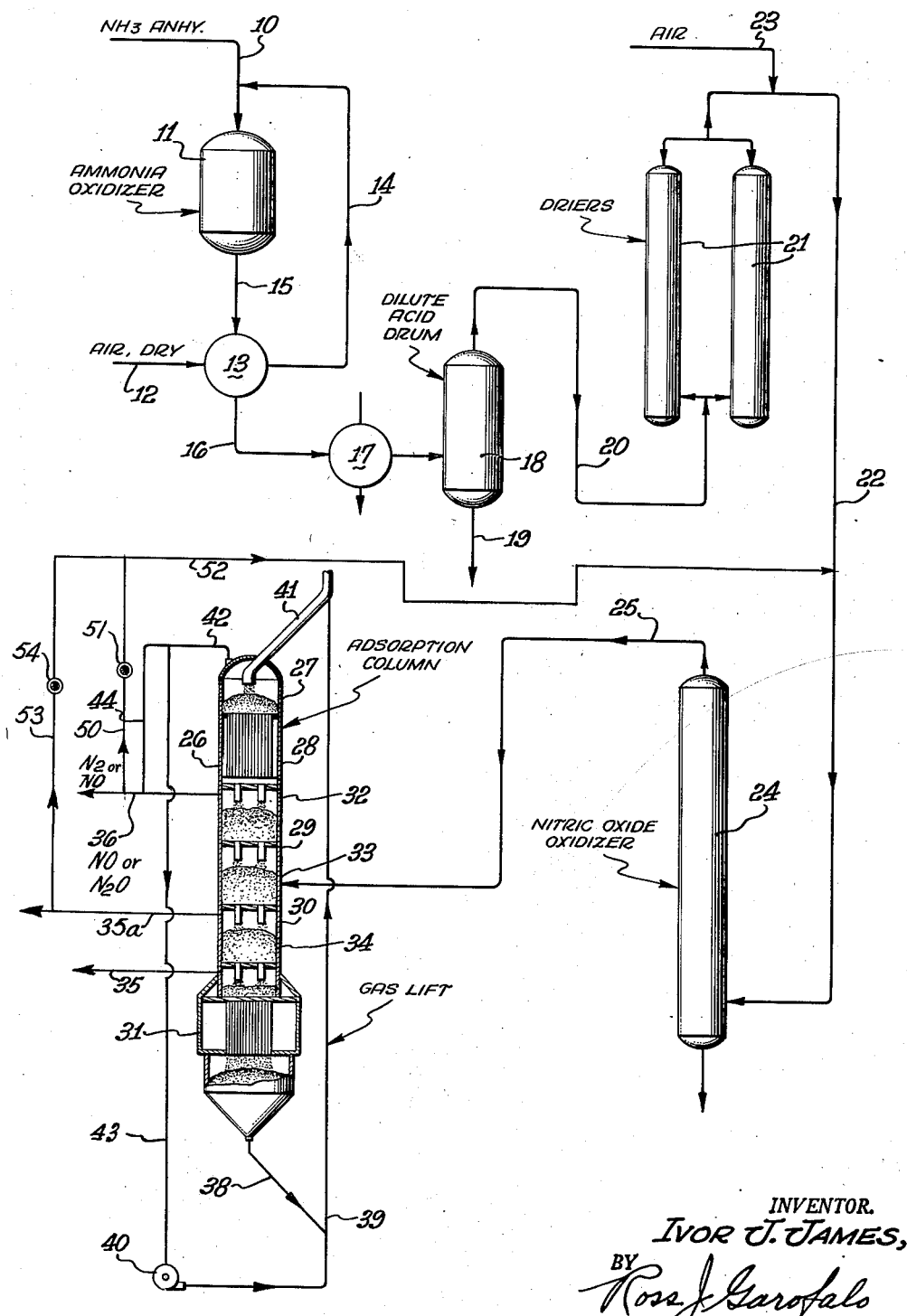

2,568,396

UNITED STATES PATENT OFFICE 2,568,396

PROCESS FOR PRODUCING AND SEPARATING NITROGEN OXIDES

Ivor J. James, Long Beach, Calif., assignor to Union Oil Company of California, Los Angeles, Calif., a corporation of California Application July 19, 1946, Serial No. 684,713

2 Claims. (Cl. 23—161)

The invention relates to the production, recovery and purification of the oxides of nitrogen. More specifically the invention relates to the recovery of nitrogen dioxide and nitrogen tetroxide from nitric oxide or nitrous oxide.

In the production of nitric acid by the catalytic oxidation of ammonia the anhydrous ammonia is oxidized over a platinum or other type catalyst in the presence of dry air to form nitric oxide which oxidizes in part to $NO_2$ and $N_2O_4$. The latter two oxides are taken up by the water formed in the reaction and the dilute acid thus formed is recovered from the nitric oxide, which after drying, is oxidized to nitrogen dioxide and tetroxide. In the conventional nitric acid process the effluent gases from the nitric acid oxidizer, comprising the three above named oxides of nitrogen as well as oxygen and nitrogen, are contacted in a scrubbing tower with water to produce nitric acid.

The catalytic oxidation of ammonia to produce nitric acid is carried out commercially both at atmospheric and at elevated pressures, each method possessing certain advantages over the other. In atmospheric pressure operation nitric acid of from 48% to 52% by weight of $HNO_3$ is produced. At elevated pressures, as for example, four atmospheres, nitric acid of 60% concentration may be obtained in an absorption column of 12 theoretical trays, and at a pressure of 7.8 atmospheres nitric acid of the same concentration may be obtained with seven theoretical trays.

However, this process is not adaptable, as is, to the production of highly concentrated nitric acid. If 95% or higher nitric acid is desired 50% or 60% $HNO_3$, produced in the ammonia oxidation process, is concentrated by adding 66° Baumé sulfuric acid and distilling the concentrated nitric acid from the retort. In another method known as the "Fauser Process" the reactants from the ammonia oxidizer or converter are cooled rapidly in order to condense the water of reaction, leaving the greater part of the nitric oxide unoxidized under these conditions. The nitric oxide is subsequently oxidized to $NO_2$ and $N_2O_4$ which gases are introduced into a cooling tower operated at −10° C. and at 10 atmospheres. In addition to the gases the prepared amount of dilute nitric acid is introduced at the top of the tower. There passes out at the bottom a mixture of liquefied $N_2O_4$ and dilute acid which is pumped into an autoclave. The temperature in the autoclave is maintained at 70° C. and oxygen, under a pressure of 50 atmospheres, is introduced into the autoclave, whereby in approximately four hours the reaction of the nitrogen tetroxide, water and oxygen to form $HNO_3$ has gone to completion.

Both of these methods of preparing pure nitric acid are faced with numerous difficulties and particularly in the last named process wherein the effect of the high vapor pressure of $N_2O_4$ even in the region of its freezing point tends to result in a large loss of the gas into the gaseous phase. In this nitric acid process as well as in the processes designed for the sole purpose of recovering nitrogen dioxide or tetroxide, the effect of the high vapor pressure of the oxide even at its freezing point necessitates tremendous recycle of the gaseous impurities in order to recover therefrom the nitrogen tetroxide remaining therein.

Nitrogen dioxide and tetroxide also arise in admixture with other gases in processes other than the nitric acid processes described above and it is to be understood that the present invention is directed in part to the purification and recovery of these oxides of nitrogen regardless of their source. Thus, in the vapor phase nitration of saturated organic compounds, there are produced considerable quantities of nitrous oxide and nitric oxide as by-products, the latter readily oxidizing to the nitrogen dioxide and nitrogen tetroxide. For example, in the liquid phase nitration of a saturated hydrocarbon with nitrogen tetroxide there was obtained as an effluent gas from the reaction a gaseous mixture of approximately the following composition:

|  | Percent |
|---|---|
| Hydrocarbon | 0.5 |
| $CO_2$ | 5.0 |
| CO | 3.0 |
| $N_2O$ | 16.0 |
| NO | 74.5 |
| $N_2$ | 1 |

The above examples serve only to show the possible occurrence of these oxides of nitrogen in commercial processes and are not intended to limit the source thereof to the particular instances referred to.

Nitrogen dioxide and nitrogen tetroxide have potentially a wide field of usage, limited at the present time because of the expense of the gas due to the difficulties of its recovery and purification. Thus the pure gas is desirable for the preparation of concentrated nitric acid, for nitration reactions in which it is desirable that water be absent, in the preparation of organic nitrites and nitrates, as a nitrosating agent for the synthesis of the nitroso compounds, and the like. Similarly, nitrous oxide which may also be recovered from the gaseous mixtures in which it is contained by the process of my invention is of importance as a valuable anesthetic.

It is therefore a primary object of my invention to provide an improved process for the production and purification of certain of the oxides of nitrogen as hereinafter set forth.

It is a more particular object of my invention to provide an improved process for the production, recovery and purification of nitrogen dioxide and its dimer nitrogen tetroxide.

It is another object of my invention to provide a process for the separation of nitrous oxide from nitric oxide, nitrogen and oxygen as well as a process for the separation of nitrous oxide from nitrogen dioxide and its dimer.

It is a further object of the present invention to provide a process for the separation of a mixture of the oxides of nitrogen into three fractions of substantial purity; one rich in nitric oxide, another in nitrous oxide and a third in nitrogen dioxide or its dimer.

Other objects and advantages of my invention will become apparent to those skilled in the art as the descrtpion thereof proceeds.

According to the present invention the above contemplated objects are attained by the utilization of a process of charcoal adsorption whereby these oxides of nitrogen may be separated from each other and from contaminating gases. For the purposes of this invention nitrogen dioxide and its dimer nitrogen tetroxide are considered to be one and the same compound for they are invariably associated with each other and function in the same manner as a result presumably of the spontaneous formation of $N_2O_4$ from $NO_2$ upon any disturbance of the equilibrium as a function of temperature.

It has been known for some time that certain solids adsorbents such as for example activated charcoal or silica gel will adsorb some gases such as water vapor, benzene vapor, butane, and the like, more readily than they will other gases such as hydrogen, nitrogen, methane, and the like, and that by heating the enriched adsorbent containing the adsorbed gases these gases may be liberated substantially completely and the adsorbents used again, after being cooled, for further adsorption. This knowledge has led to the development of various processes for the separation of low molecular weight hydrocarbon gases from each other and from other contaminating gases. The present invention contemplates means of employing a process of this type to effect the separation and purification of gases which hitherto have been purified only by means of expensive and difficult methods.

In general, the process of separating gaseous mixtures by selective adsorption on granular charcoal involves the steps of countercurrently adsorbing certain components of the gaseous mixture in a charcoal bed and preferably in a moving bed of charcoal. In a moving bed operation the charcoal upon which certain of the gaseous components have been adsorbed, flows from an adsorption zone through one or more rectification zones as hereinafter more fully described, and into a stripping section wherein the adsorbed components are desorbed from the charcoal by means of heat and in the process as heretofore employed with the aid of a stripping gas such as steam. The stripped charcoal is subsequently cooled prior to repassage through the adsorption section. In a stationary bed operation the same series of operations would be performed, and the same factors would of necessity be taken into consideration.

As an example of one modification of the process of my invention there is shown in the drawing means for producing a substantially pure fraction of nitrogen dioxide and nitrogen tetroxide by suitable combination of an amonia oxidation unit and an adsorption column. To clarify the description of the process and apparatus as shown in the drawing it is described relative to a particular example.

Referring to the figure, 7500 pounds of anhydrous ammonia per day are introduced by means of line 10 to the ammonia oxidizer 11. At the same time air equivalent to 830 mols per day of oxygen and 3139 mols per day of nitrogen is introduced to the oxidizer by means of line 12 passing through heat exchanger 13 and line 14, mixing in line 10 with the anhydrous ammonia before passage thereof into the ammonia oxidizer. The oxidizer, as previously set forth, may contain a catalyst such as platinum gauze, or the like, wherein the ammonia is oxidized to yield a product, withdrawn from the ammonia exchanger by means of line 15, comprising 9.3% of nitric oxide, 0.5% of ammonia, 6.8% of oxygen, 69.5% of nitrogen, and 13.95% of water. The ammonia oxidation is carried out by introducing the gaseous feed to the oxidizer at a temperature of approximately 200° C. and a pressure in the range of about 0 to about 150 pounds per square inch guage. Due to the heat of oxidation the temperature of the platinum catalyst in the oxidizer may be as high as 950° C. to 1000° C. and the effluent gases are generally at a temperature of 600° C. or higher. The effluent gases withdrawn from the oxidizer 11 by means of line 15 at a temperature of about 600° C. are utilized in the heat exchanger 13 to heat the dry air entering the system by means of line 12. The partially cooled gases are withdrawn from the exchanger 13 through line 16 into the cooler 17 and subsequently into the dilute acid drum 18. In the dilute acid drum 18 the condensed water containing absorbed therein any nitrogen dioxide or nitrogen tetroxide formed by the partial oxidation of the nitric oxide, is withdrawn from the drum by means of line 19 as dilute nitric acid of approximately 35% concentration. The gaseous effluent from the dilute acid drum is passed through line 20 to the silica gel driers 21 which are provided in pairs to permit alternate regeneration and drying so as to not interrupt the continuity of the process. The dry gases are withdrawn from the silica driers 21 by means of line 22 and secondary air is added thereto by means of line 23, the entire mixture passing into the nitric oxide oxidizer 24. The composition of the gases entering the oxidizer is approximately 8.5% nitric oxide, 7.50% oxygen, 83.48% nitrogen and possibly traces of ammonia. The oxidizer is maintained at a temperature of approximately 70° F. and sufficient residence time is allowed to permit the oxidation of approximately 98% of the nitric oxide to nitrogen dioxide or nitrogen tetroxide. The gases withdrawn from the nitric oxide oxidizer 24 by means of line 25 comprise approximately 4.55% nitrogen tetroxide, 0.39% nitrogen dioxide, 0.39% nitric oxide, 3.8% oxygen, 89.5% nitrogen, and possibly traces of ammonia. This gaseous mixture which in the present operation amounted to approximately 1360 MSCF per day is fed to the adsorption column 26.

The charcoal adsorption column 26 is made up of a charcoal hopper 27, a cooling section 28, an adsorption section 29, a rectification section 30 and a stripping section 31. Separating the cooling section, adsorption section, rectification section and stripping section from each other there are disengagers 32, 33 and 34 which may consist of conventional tube bundles projecting downward from a tray. The charcoal flows through these tubes, leaving a space containing no charcoal between the tray and the surface of the charcoal leaving the lower ends of the tubes, whereby gases may be withdrawn from, or introduced to, the column at a substantially uniform rate from or to the entire cross-sectional area of the bed at each of these spaces in these sections. The charcoal flows from the hopper 27, through the cooler 28, through the tubes of the disengager 32, into the adsorption section 29 and is therein contacted with the above defined gaseous mixture introduced into the column at disengager 33 by means of line 25. In the adsorption section substantially all of the nitrogen dioxide and tetroxide are adsorbed on the charcoal while the nitrogen, oxygen, and nitric oxide pass through the adsorption section and are withdrawn in part at disengager 32 by means of line 36. The charcoal passing from the adsorption section 29 through disengager 33 into the rectification section 30 is substantially saturated with $NO_2$ and $N_2O_4$ and may contain traces of nitrogen, oxygen or nitric oxide. Rectification section 30a is explained below, and may be disregarded here.

In the rectification section 30, the charcoal is contacted with additional quantities of $NO_2$ and $N_2O_4$ liberated from the charcoal in the stripping section as hereinafter described, to effect the desorption from the charcoal of any nitrogen, oxygen or nitric oxide, which may be contained thereon, by virtue of the selective adsorption of the $NO_2$ and $N_2O_4$.

The charcoal then flowing from the rectification section 30 through the disengager 34 into the stripping section 31 is substantially completely saturated with $NO_2$ and $N_2O_4$ and is therein heated to a sufficiently high temperature to effect the desorption of the majority of the adsorbed gases. The present process must be operated in the entire absence of steam for the presence thereof would of course cause the formation of nitric acid within the adsorption column. It should be pointed out that the use of steam in conventional adsorption processes is necessary to effect the stripping of the hydrocarbon components from the adsorbent, but I have found that the present process which necessitates the stripping of $NO_2$ and $N_2O_4$ may be effectively carried out without the use of a stripping gas. This stripping is accomplished solely by heating the charcoal in the stripping section to a temperature in the approximate range of about 400° F. to about 600° F. The charcoal may be heated to a temperature in this range by circulating hot gases such as flue gas or liquids around the tubes through which the charcoal flows into the stripping section. If the process involves stripping one of the lower molecular weight oxides of nitrogen from the charcoal somewhat lower temperatures may be employed. The above indicated temperature range is not therefore to be construed as limiting even with respect to the stripping of nitrogen dioxide and nitrogen tetroxide from the charcoal and is set forth only as being the optimum range in which to strip these last named oxides.

The stripped $NO_2$ and $N_2O_4$ pass upwardly from the stripping section countercurrently to the downward flow of charcoal and are withdrawn in part from the adsorption column by means of line 35 which draws the gases from the column at disengager 34. A portion of the stripped gases is caused to flow through the disengager 34 into the rectification section 30 to effect therein the desorption of any residual quantities of nitrogen, oxygen, or nitric oxide contained on the charcoal as above described. This desorption of these last mentioned gases is brought about by the selective adsorption of the stripped gases which are therefore returned with the charcoal to the stripping section thus affording a continuous circulatory reflux without loss of the stripped gases from the rectification and stripping sections.

The stripped charcoal flows from the stripping section into the bottom of the adsorption column where means may be provided, if desired, to control the rate of flow of the charcoal and to maintain in the lower portion of the column a constant level of charcoal so as to equalize the pressure drops throughout the system. The charcoal flows from the bottom of the column through transfer line 38 into the gas lift line 39. Lean gas, which in this case, comprises a mixture of nitrogen, oxygen and nitric oxide is forced through the lift line 39 by means of blower 40 carrying with it charcoal introduced into the lift line by means of transfer line 38, and the charcoal and lift gas flow into the charcoal gas separator 41 from whence the charcoal falls into the hopper 27 and the lift gas is withdrawn from the hopper 27 by means of line 42 and is returned to the blower 40 by the return line 43.

As above mentioned, only a portion of the unadsorbed gases is removed from the adsorption section 29 by means of line 36, the remaining portion being caused to flow countercurrently to the charcoal through disengager 32, cooler 28, and hopper 27 into the lift gas or lean gas vent line 42. This countercurrent passage of a portion of the unadsorbed gases through the cooling section has the dual effect of aiding in the cooling of the charcoal and at the same time effecting a certain degree of preliminary adsorption of these gases on the charcoal which has the effect of reducing, to a certain extent, the temperature rise in the adsorption section resulting from the adsorption of these gases. As a result of the continual introduction of additional quantities of these lean gases into the gas lift system a build up of gas in the gas lift system must be avoided, which may be accomplished by means of line 44 whereby gas may be continually bled from the gas lift system and combined with the lean gas production in line 36.

By this method of separation I am able to obtain from the adsorption column when operating on a feed as above described a lean gas fraction comprising 0.3% NO, 0.4% $NH_3$, 3.8% $O_2$, and 95.5% $N_2$, and a make gas fraction comprising 95% or better of $NO_2$ and $N_2O_4$. With a feed such as that described there is recovered a lean gas stream of approximately 1293 MSCF per day, and a make gas stream approximately 67 MSCF per day of compound $NO_2$ and $N_2O_4$ of 95% purity or better.

The particular example utilized to aid in the description of the modification of my invention as shown in the drawing is not intended to limit the process of the invention to such operation. Thus, if the ammonia oxidizer be substituted with a vapor phase nitration unit the resulting gaseous product would contain considerable quantities of nitrous oxide and nitric oxide, and this gaseous product could be introduced directly to an adsorption column (such as that shown in the drawing) whereby a separation can be effected between the nitrous oxide as a make gas, corresponding to the nitrogen dioxide and tetroxide in the above example, and nitric oxide as a lean gas together with nitrogen, carbon monoxide and other possible impurities. In this manner a typical effluent from a vapor phase nitration operation as hereinbefore set forth may be separated into two fractions: one containing 95% or more of nitrous oxide and the other containing 80% or more of nitric oxide. Alternatively, an effluent from a vapor phase nitration process such as that described may be oxidized to convert a major portion of the nitric oxide to nitrogen dioxide and tetroxide whereafter the mixture may be subsequently separated in an adsorption column such as that shown in the drawing, in which case there will be obtained as the lean gas a fraction rich in nitrous oxide which fraction will also contain any unoxidized nitric oxide and a make gas fraction of 95% or more concentration of $NO_2$ and $N_2O_4$. This latter fraction is then recycled to the nitration unit to provide make up for the nitrating gases.

Thus I may further combine the processes of ammonia oxidation and hydrocarbon nitration and by means of the separations made possible by the present invention increase the efficiency thereof by returning to the nitration unit the nitrating oxides, i. e. $NO_2$ and $N_2O_4$. In such a process ammonia is oxidized as shown in the drawing, the nitric oxide is oxidized in the oxidizer 24. The resulting $NO_2$ and $N_2O_4$ are separated from contaminating gases in the adsorption column 26 and are fed directly to the vapor phase nitration unit. The effluent gases from the nitration unit consisting predominantly of nitric oxide and nitrous oxide is recycled to the nitric oxide oxidizer to convert the nitric oxide formed in the nitration reaction to nitrogen dioxide or tetroxide. Thus the effluent gases from the nitration unit are commingled with the product gases from the ammonia oxidizer either in line 20 before passage through the driers 21 or in line 22 before passage into oxidizer 24. In either case the nitric oxide from the nitration reaction is used to augment the nitrating gases by oxidation to $NO_2$ or $N_2O_4$ and subsequent separation thereof in the adsorption column.

With respect to these oxides of nitrogen, viz., NO, $N_2O$, $NO_2$ and $N_2O_4$, the degree of adsorption on the charcoal varies proportionally with the molecular weight. Although this relationship does not hold true with all gases I have found it to be so with these nitrogen oxides. Thus nitrous oxide is more readily adsorbed by the charcoal than is nitric oxide and nitrogen dioxide and tetroxide are more readily adsorbed than are either nitrous or nitric oxide. This selectivity, based on the molecular weight of the oxides, is one of the factors making the process of the present invention possible.

As described above, the adsorption column may be modified by the addition thereto of a secondary rectification section whereby it is possible to obtain in the same separation process three fractions from a given gaseous mixture by the utilization in the initial rectification section of a fraction of the gases desorbed in the secondary rectification section by virtue of the contact of the charcoal in the secondary rectification section with a portion of the gases stripped from the charcoal in the stripping section. For example, if a gas from the vapor phase nitration of hydrocarbons were to be only partially oxidized there would be contained in the mixture some unoxidized nitric oxide, nitrous oxide and nitrogen dioxide and tetroxide together with other impurities. By introducing this gaseous mixture into an adsorption column similar to that shown in the drawing, but modified to the extent of containing an additional rectification section, there would be adsorbed on the charcoal in the adsorption section substantially all of the nitrous oxide, nitrogen dioxide and nitrogen tetroxide. As a lean gas, recovered as a substantially unadsorbed fraction from the adsorption section, there is obtained a fraction rich in any unoxidized nitric oxide present in the feed mixture. This fraction of the nitric oxide is then recycled through line 50, valve 51 and line 52 to the oxidizer to insure maximum recovery of potential $NO_2$ and $N_2O_4$. The saturated charcoal flowing from the adsorption section 29 is passed through a disengager into a primary rectification section 30a wherein it is contacted with additional quantities of nitrous oxide liberated from the charcoal in the secondary rectification section 30 as hereinafter described to insure the desorption of any nitric oxide or other contaminating gases which may have been contained on the charcoal flowing from the adsorption section into the primary rectification section. The charcoal flowing from the primary rectification section through a disengager into a secondary rectification section will therefore be substantially free of nitric oxide or other contaminating gases and upon contacting the charcoal in this secondary rectification section with additional quantities of nitrogen dioxide and tetroxide liberated therefrom in the stripping section there will be desorbed a fraction rich in nitrous oxide which is used in part to effect the above described reflux in the primary rectification section and is removed in part from the adsorption column through line 35a at the disengager separating the primary and secondary rectification sections as a fraction of nitrous oxide. The charcoal flowing from the secondary rectification section into the stripping section is thus substantially saturated with nitrogen dioxide and tetroxide having been freed of nitrous oxide by the preferential adsorption exhibited by the charcoal for the nitrogen dioxide and tetroxide which are liberated from the charcoal in the stripping section by the application of heat. The liberated nitrogen dioxide and tetroxide are used in part to effect the reflux in the secondary rectification section as above described and are in part withdrawn from the column at the disengager separating the secondary rectification section from the stripping section as a fraction rich in these two oxides. This fraction rich in nitrogen dioxide and tetroxide is then recycled to the nitrating unit as nitrating gas.

The above described process is substantially similar to that described with reference to the drawing and contains only the modification of an additional adsorption section and should be readily understandable by reference to the drawing. If this modification is not used, 30a and 35a are simply omitted.

In the utilization of charcoal adsorption in combination with the oxidation of ammonia many alternative procedures may be employed depending upon the circumstances surrounding the operation. Thus by the adoption of the above described three fraction separation method, the unoxidized nitric oxide may be recovered as an individual fraction contaminated only by oxygen. In this type of separation the nitrogen, derived from the usage of air as the oxidizing medium, is recovered from the adsorption section through line 36 as the substantially unadsorbed gas, while the nitric oxide is recovered as a side cut through line 35a by virtue of its desorption from the charcoal by nitrogen dioxide and tetroxide liberated from the charcoal in the stripping section. The distribution of the oxygen between the lean gas or nitrogen fraction and the side cut or nitric oxide fraction is a function of such operational variables as temperature, pressure and charcoal circulation rates. The nitric oxide fraction is then recycled through line 53, valve 54 and line 52 to the nitric oxide oxidizer thereby permitting a higher recovery of $NO_2$ and $N_2O_4$ from the adsorption unit.

In cases where there is no appreciable amount of nitrogen in the mixed nitrogen oxides, such as obtained from the nitric oxide oxidizer, there is no need of the three fraction separation for the nitric oxide, together with any oxygen which may be present, will be obtained as the lean gas fraction. This fraction may subsequently be utilized as such or recycled to the oxidizer to complete the oxidation to nitrogen di- and tetroxides. It is to be understood that any or all of these possible alternative procedures as well as others not described are within the contemplation of the present invention.

I have further found that the separation of these oxides of nitrogen from each other by the process of selective charcoal adsorption is rendered more efficient by the operation of the process under elevated pressures which, although not increasing the selectivity of the charcoal does increase the capacity thereof and permits better separation at lower charcoal circulation rates. Whether or not pressure is employed is dependent upon the particular mixture to be separated and upon the necessary charcoal circulation rates required for the separation of that particular mixture. In general, I have found that pressures in the range of 2 to 10 atmospheres are desirable as increasing the efficiency of the process over and above the attained increase in cost of operation.

The temperature at which the charcoal adsorption is carried out appears, in the case of the nitrogen oxides, to have an effect directly opposite to that of pressure. I have found that anything done to increase the adsorption capacity of the charcoal, whether or not the selectivity thereof is effected, materially enhances its operation. Thus increasing pressures and decreasing temperatures favor the separations because they have the effect of increasing this adsorptive capacity. Practical considerations such as process economics enter in to dictate what conditions should be employed. In general it is more expedient to increase the pressure to obtain any desired increase in adsorption than it is to decrease the temperature of the entire system. For this reason the charcoal adsorption is usually carried out at atmospheric temperatures although lower temperatures are of course included within the scope of my invention.

Having disclosed a process for the production and purification of certain of the oxides of nitrogen, and particularly of nitric oxide, nitrous oxide and nitrogen dioxide or its dimer nitrogen tetroxide, which involves either the combination of conventional processes of generating these gases and a modified process of selective adsorption or alternatively solely a modified process of selective adsorption to be operated for the separation of these gases regardless of their origin and realizing that many modifications therein may occur to those skilled in the art without departing from the spirit or scope of my invention, I claim:

1. A continuous process for the separation of a gaseous mixture comprising nitrogen dioxide, nitrogen tetroxide, nitrous oxide and nitric oxide into three fractions, a primary fraction enriched in nitric oxide, a secondary fraction enriched in nitrous oxide and a tertiary fraction enriched in nitrogen dioxide and nitrogen tetroxide which comprises countercurrently contacting said gaseous mixture with a moving bed of granular charcoal in the adsorption zone of an adsorption column wherein the said charcoal selectively adsorbs from said gaseous mixture the said nitrous oxide, nitrogen dioxide and nitrogen tetroxide leaving said nitric oxide as a substantially unadsorbed gas, removing said nitric oxide from the said adsorption column, causing said granular charcoal containing adsorbed thereon said nitrous oxide, nitrogen dioxide and nitrogen tetroxide to flow from said adsorption section to a primary rectification section, contacting said granular charcoal containing said adsorbed gases in said primary rectification section with additional quantities of said nitrous oxide whereby the said additional quantities of nitrous oxide will be preferentially adsorbed on said granular charcoal thereby effecting the preferential desorption of any nitric oxide which may have been adsorbed on said charcoal, causing said nitric oxide to flow countercurrently to said charcoal from said primary rectification section to said adsorption section, causing said charcoal to flow from said primary rectification section to a secondary rectification section, contacting said charcoal in said secondary rectification section with additional quantities of nitrogen tetroxide and nitrogen dioxide whereby the last named gases are preferentially adsorbed on said charcoal, causing nitrous oxide to be preferentially desorbed and flow countercurrently to said charcoal from said secondary rectification section, returning one portion of said nitrous oxide to said primary rectification section to effect therein said selective desorption of said nitric oxide, removing the other portion of said nitrous oxide from said adsorption column as said secondary fraction substantially free from nitric oxide, causing said charcoal containing adsorbed thereon said nitrogen dioxide and nitrogen tetroxide to flow from said secondary rectification section to a stripping section wherein the said charcoal is stripped of said last named gases by heating said charcoal to a temperature in the range of from about 400° F. to about 600° F. in the absence of steam, causing a portion of said stripped gases to flow countercurrently to said charcoal from said stripping section to said secondary rectification section to effect therein the selective desorption of said nitrous oxide, removing the remaining portion of said nitrogen dioxide and nitrogen tetroxide from said adsorption column as said tertiary fraction of said gaseous mixture substantially free from said nitric oxide and said nitrous oxide, conveying said granular charcoal from said stripping section to the top of said adsorption column, passing said granular charcoal through a cooling section in the top portion of said adsorption column and returning the same from said cooling section to said adsorption section.

2. A process for the production of nitrogen dioxide, which comprises oxidizing a gaseous mixture containing nitric oxide and nitrous oxide to convert a portion of the nitric oxide to nitrogen dioxide, separating the resulting mixture by selective adsorption on charcoal to obtain three fractions enriched in nitric oxide, nitrous oxide, and nitrogen dioxide respectively, and recycling a portion of the nitric oxide fraction to the oxidation step, said selective adsorption being carried out by countercurrently contacting said resulting gaseous mixture with a moving bed of granular charcoal in the adsorption zone of an adsorption column wherein the charcoal selectively adsorbs the nitrous oxide and nitrogen dioxide leaving nitric oxide as a substantially unadsorbed gas fraction, contacting the granular charcoal containing said adsorbed gases in a primary rectification zone with additional quantities of nitrous oxide thereby effecting the preferential desorption of any nitric oxide which may have been adsorbed on the charcoal, causing the desorbed nitric oxide to flow countercurrently to the charcoal from the primary rectification zone to the adsorption zone, contacting the charcoal from the primary rectification zone in a secondary rectification zone with additional quantities of nitrogen dioxide, causing nitrous oxide to be preferentially desorbed, returning one portion of the desorbed nitrous oxide to the primary rectification zone to effect therein the selective desorption of nitric oxide, removing the other portion of the desorbed nitrous oxide from the adsorption column, stripping the adsorbed nitrogen dioxide from the charcoal from the secondary rectification zone in a stripping zone by heating the charcoal to a temperature in the range of from about 400° F. to about 600° F. in the absence of steam, returning a portion of the stripped nitrogen dioxide to the secondary rectification zone to effect the selective desorption of nitrous oxide, and removing the remaining portion of said nitrogen dioxide from the adsorption column.

IVOR J. JAMES.

REFERENCES CITED

The following references are of record in the file of this patent:

UNITED STATES PATENTS

| Number | Name | Date |
|---|---|---|
| 879,129 | Dewar | Feb. 11, 1908 |
| 1,335,348 | Patrick et al. | Mar. 30, 1920 |
| 1,422,007 | Soddy | July 4, 1922 |
| 1,610,288 | Jones et al. | Dec. 14, 1926 |
| 1,735,342 | Taylor et al. | Nov. 12, 1929 |
| 1,825,707 | Wagner | Oct. 6, 1931 |
| 1,991,452 | Fauser | Feb. 19, 1935 |
| 2,018,249 | Caro et al. | Oct. 22, 1935 |
| 2,135,733 | Richardson | Nov. 8, 1938 |
| 2,384,311 | Kearby | Sept. 4, 1945 |

FOREIGN PATENTS

| Number | Country | Date |
|---|---|---|
| 6,155 of 1908 | Great Britain | July 2, 1908 |

OTHER REFERENCES

Garner, J. B.: "Charcoal as an Adsorbent," Natural Gas, volume 5, No. 11, November 1924, pages 3 and 4.

Brunauer: "The Adsorption of Gases and Vapors," vol. 1, "Physical Adsorption," Princeton University Press, 1945, pages 11 and 12.